United States Patent
Toney

[15] 3,635,832
[45] Jan. 18, 1972

[54] DECORATIVE COMPOSITION
[72] Inventor: Jack Toney, Minneapolis, Minn.
[73] Assignee: Craft Master Corporation
[22] Filed: May 26, 1969
[21] Appl. No.: 827,888

[52] U.S. Cl..............252/301.3 R, 106/15 FP, 252/301.2 R, 240/2.25
[51] Int. Cl. .......................................................C09k 1/00
[58] Field of Search.....................252/301.2, 301.3, 301.2 R, 252/301.3 R; 240/2.25; 106/15 FP

[56] References Cited

UNITED STATES PATENTS

| | | | |
|---|---|---|---|
| 1,025,338 | 5/1912 | Troy ...................................252/301.2 |
| 3,041,187 | 6/1962 | Jordan et al. ............................106/15 |

OTHER PUBLICATIONS

Kirk–Othmer, Encyclopedia of Chemical Technology Interscience Publishers, New York, N.Y., vol. 9 (1965) p. 880
"Science News Letter" Dec. 13, 1947, p. 379– 380.

*Primary Examiner*—Tobias E. Levow
*Assistant Examiner*—A. P. Demers
*Attorney*—Anthony A. Juettner, William C. Babcock and Patrick J. Span

[57] ABSTRACT

There are disclosed improved decorative compositions containing a flock agent, generally combined with an adhesive in which at least a portion of the flock agent is composed of particles containing an ultraviolet responsive, luminescent material. The particles preferably have an average size in the range of 25 microns to one-half inch. The compositions are useful in decorating surfaces such as Christmas trees, floats and glass windows, particularly where a flocked decorative design is desired.

4 Claims, No Drawings

DECORATIVE COMPOSITION

This invention relates to an improved decorative composition and in particular to a decorative composition containing a flock agent and an adhesive, which will provide a glowing or starlike effect.

Decorative compositions of a flock agent and adhesive, particularly those adapted for spraying so as to provide a simulated snow effect on surfaces such as Christmas trees are well known and commercially available. These decorative compositions can be used on floats or on surfaces such as glass windows and the like to provide a flocked decorative design. Illustrative of one such composition is disclosed in U.S. Pat. No. 3,041,187, to which the present invention is particularly applicable. The disclosure of the compositions of U.S. Pat. No. 3,041,187 is hereby incorporated by reference as the present invention is an improvement thereover.

There are disclosed in U.S. Pat. No. 3,041,187, decorative compositions consisting essentially of a dry mixture of a flock agent and an adhesive. The adhesive component is composed essentially of pregelatinized starch or flour although small amounts of secondary adhesives may be incorporated, such as borax. The flock agent as disclosed in the patent may be of virtually any material. A wide variety of flock agents are disclosed, the preferred being woodpulp (sulfite pulp). Other flock agents disclosed are cotton, rayon, cellulose acetate, vegetable fibers, such as jute, synthetic fibers, such as polyvinylidene fibers and polyester (Dacron) fibers, animal hairs such as rabbit, horse, goat and hog hair, and other agents such as glass, wool, asbestos, chopped feathers.

The present invention is an improved decorative composition wherein at least a portion of the flock agent is composed of discrete, independent particles of an ultraviolet responsive luminescent material. These particles present separate and distinct light sources in the composition when exposed to ultraviolet light. Accordingly, when a portion of the flock agent is composed of the luminescent particles and the composition is sprayed applied, as described in U.S. Pat. No. 3,041,187, to a Christmas tree for example, the result is a flocked tree which when exposed to ultraviolet light will present distinct light sources providing starlike, jewellike, diamondlike, or other lighting effect dependent on the size of the particles. With the smaller particle sizes, 25 microns to 0.25 inch, the effect is a starlike one. With larger particles up to about one-half inch in size, the particles resemble more conventional light bulbs (Christmas tree lights), although the fluorescent glow is quite subdued in comparison with conventional bulbs. With larger particles, the composition may not be capable of being applied by spraying, however, as disclosed in U.S. Pat. No. 3,041,187, any other conventional method of applying decorative compositions may be used.

As indicated, the ultraviolet, responsive luminescent materials comprise at least a portion of the flock agent. When comprising only a portion, the final result is a flocked tree with some luminescent light sources when exposed to ultraviolet light. Where flocked substrates are not desired, the entire flock agent is composed of the luminescent particles. This might be desired at Christmas time where the natural green tree is desired. In such instance, the natural tree merely has distinct luminescent particles adhered thereto.

When flocking is desired, the amounts of adhesive and flock agent correspond substantially to those set forth in U.S. Pat. No. 3,041,187, and the luminescent particles comprise from about 0.1 to 25 percent of the total weight flock agent. Thus in a decorative composition consisting essentially of a dry mixture of flock agent and adhesive, the luminescent particles will comprise from 0.1 to 25 percent, preferably 0.2 to 15 percent by weight of the flock agent, the remainder being a nonluminescent flock agent such as the sulfite pulp (woodpulp) described in U.S. Pat. No. 3,041,187. In situations wherein substantially no flocking per se is desired, the luminescent particles comprise 100 percent of the flock agent. In such a case the decorative composition will comprise from 0.3 to 60 percent of luminescent flock agent and 40 to 99.7 percent of adhesive, dependent on the size of the particles and the amount of luminescent particles desired. The preferred compositions will comprise 0.5 to 20 percent of the luminescent flock agent and 80 to 99.5 percent adhesive, based on the total weight of flock agent and adhesive.

The luminescent particles are composed of discrete particles of various materials which have been coated, impregnated, or have dispersed therein a luminescent pigment or dye, the particular pigment or dye determining the final color glow of the particle. A large variety of fluorescent pigments and dyes are commercially available and are sold in bulk or consumer size or in aerosol spray containers. Some of the fluorescent pigments are Lumigraphic (Hercules Powder Company), Hi-Viz (Lawter Chemicals, Inc.), Velva-Glo (Radiant Color Company), and Day-Glo (Switzer Brothers, Inc.). For a detailed discussion of the fluorescent pigments and luminescent materials, reference is made to Kirk-Othmer, Encyclopedia of Chemical Technology, Vol. 9, 2nd Ed., 1966, pp. 483–506, and Vol. 12, 2nd Ed., 1967, pp. 616–631. In general, such fluorescent pigments are dispersed in a vehicle such as lacquers or mixtures of aromatic and aliphatic hydrocarbons, and in such form can then be sprayed or applied to coat or impregnate substrates. The pigments may also be dispersed within the various materials prior to formation of the discrete particles. A discussion of the incorporation of fluorescent pigments in various plastic materials such as vinyl resins, polyethylene and polyester, can be found in Modern Plastics, Feb. 1961, pp. 88–90 and 166–168.

In general, any ultraviolet responsive luminescent material can be used, organic and inorganic. Among the inorganic crystals are the phosphors, which are generally polycrystalline in nature, composed of sulfides or silicate of zinc, cadmium, barium or strontium. Often small amounts of activators are associated therewith such as copper, silver, manganese or rare earths. Fluorescence is exhibited by the minerals scheelite, willemite, calcite, scapolite, and sphalerite. Among the organic dyes, one of the most common are the rhodamine dyes and uranine dyes which provide various colors: Rhodamine 6 G (CI Basic Red 1 ), Rhodamine B (CI Basic Violet 10 ) and Uranine (CI Acid Yellow 73). Uranine is a sodium derivative of fluorescein. Other materials are optical brighteners which absorb ultraviolet light and emit a visible blue light, among which are derivatives of 4,4'-diaminostilbene-2,2'-disulfonic acid, coumarin derivatives such as 4-methyl-7-diethylaminocoumarin and umbelliferone.

As indicated, a large variety of fluorescent pigments are commercially available, the physical and chemical properties and commercial designation of the variety of color of which are seen below:

1. Physical properties
    softening point, 145°–155° C. (293°–311° F.)
    specific gravity, 1.36 g./ml.
    decomposition point, 180°–200° C. (356°–392° F.)
    refractive index, 1.64
    bulking value, 0.0883 gal./lb.; 11.33 lb./solid gallon
    particle size—standard series (plastics, paints, silk screen inks, gravure inks)
    top particle size: 40–50 $\mu$
    average particle size: 3.5 $\mu$
    medium fine series (plastics, gravure inks)
    top particle size: 10–15 $\mu$
    average particle size: 2.5 $\mu$
    ultrafine series (offset, letterpress, gravure inks)
    top particle size: 4–5 $\mu$
    average particle size: 1.2 $\mu$
2. Solubility
    insoluble—water, aliphatic and aromatic hydrocarbons, high-molecular-weight esters, glycols
    soluble or bleeding—ketones, low-molecular-weight esters and alcohols, and the glycol ethers
3. Chemical resistance
    resistant to dilute acids and alkalies; attacked by strong acids and alkalies

| Lumigraphic [1] | Hi-Viz [2] | Velva-Glo [3] | Day-Glo [4] |
|---|---|---|---|
| X-2489 Red | B-3522 Pink | R-103-G-117 Pink | A-11 Aurora Pink. |
| | B-3530 Cerise | R-103-G-116 Cerise | A-12 Neon Red. |
| | B-3534 Red | R-103-G-115 Red | A-13 Rocket Red. |
| X-2490 Orange | B-3513 Red Orange | R-103-G-114 Orange Red | A-14 Fire Orange. |
| | B-3514 Yellow Orange | R-103-G-113 Orange | A-15 Blaze Orange. |
| X-2491 Yellow R | B-3515 Gold Yellow | R-103-G-112 Orange Yellow | A-16 Arc Yellow. |
| X-2522 Yellow G | B-3539 Lemon Yellow | R-103-G-110 Chartreuse | A-17 Saturn Yellow. |
| X-2523 Green | B-3545 Green | R-103-G-111 Green | A-18 Signal Green. |
| | B-3558 Vivid Blue | R-103-G-119 Blue | A-19 Horizon Blue. |

[1] Imperial Color and Chemical Department, Hercules Powder Co.
[2] Lawter Chemicals, Inc.
[3] Radiant Color Co.
[4] Switzer Bros., Inc.

In general, the luminescence is at an optimum with substantially pure white opaque materials. Accordingly, the particles which are to be coated, impregnated or otherwise have dispersed therein the luminescent material are preferably plastic materials which are white and opaque. However, the particles may be of any solid material including the flock agents mentioned earlier and may include natural materials such as volcanic ash and mica, as well as the synthetic plastic materials. Transparent plastic materials such as many vinyl resins, polyvinylidene chloride, and polyethylene or polypropylene, may have a white pigment dispersed therein to provide the desired whiteness and opacity. One of the preferred material is expanded foamed polystyrene, Styrofoam, which is commercially available in particulate form and has a white opaque color. This material is also easy to coat or impregnate with the luminescent pigment. This material is also very light so that it does not interfere with the balance of flock agent and adhesive and thereby the sprayability of the composition. Materials which are not readily available in particulate form may be merely ground or broken in the smaller particles to the desired size before or after having added thereto the luminescent material. One method of forming the particles is to cast a film from solution or hot melt of the plastic material and incorporate the luminescent material therein before drying or solidifying or to coat the film thereafter and subsequently break the film into the desired size particles.

A preferred form of the invention for use in spraying a tree to provide a flocked tree having discrete particles of ultraviolet responsive luminescent material which when exposed to ultraviolet light will glow to provide a star or jewellike effect is obtained by taking about 0.2 oz. of particles of expanded polystyrene (Styrofoam), having an average particle size of about one-eighth inch and spraying the particles for about 30 seconds with a conventional aerosol spray can of fluorescent pigment composed of a finely divided dispersion of zinc sulfide. This product, composed of particles coated with the ultraviolet, responsive luminescent material, is then mixed or blended with 1 pound of a commercially available flocking composition composed of 60 percent by weight of sulfite woodpulp, 20 percent by weight of pregelatinized wheat starch (adhesive), 17 percent by weight of diammonium phosphate and 3 percent by weight of borax. The mixture is then sprayed simultaneously with water onto an evergreen tree to provide a flocked, fire resistant, tree which when exposed to ultraviolet light provides a myriad of tiny (about one-eighth inch size) glowing particles resembling a star or jewellike effect.

The foregoing represents a preferred form which is readily sprayed and also provides a flocked effect. Where substantially no flocking is desired, the sulfite woodpulp is omitted and the luminescent particles are merely mixed with the adhesive and remaining ingredients such as the phosphate and the borax. Based on the total weight of flock agent and adhesive, this will provide a substantially nonflocking decorative composition containing about 26 percent luminescent agent and 74 percent starch adhesive. If fire resistance is not desired, the phosphate and borax can be omitted.

While the preferred form has been illustrated using zinc sulfide as the fluorescent material, any fluorescent pigment or dye such as those earlier described may be employed in place of or in addition thereto. Different fluorescent materials may be employed to provide varying colors admixed or a vinyl fluorescent material may be employed to provide only a single color under ultraviolet light. The particulate material containing the fluorescent pigment or dye may be of very fine particle size such as 25 microns to provide a flowing dustlike effect or may be as large as one-half inch to provide a simulated light bulb effect. While the preferred form has been illustrated using a water-based adhesive, pregelatinized starch, which is preferred for home consumer use and may be sprayed simultaneously with water, other adhesives such as natural glues and synthetic thermoplastic adhesives capable of being applied in solution form may be employed where desired. In any event, the final decorative composition after application is composed of a dry mixture of flock agent and adhesive, at least a portion of the flock agent being composed of particles containing an ultraviolet responsive, luminescent material. Also while utility has been illustrated with regard to flocking of a Christmas tree, the composition can be used in other areas where decorative effects are desired such as floats, billboards, wallpapers, or forming of any ornamental articles. One area of specific utility can be found in more detail in my copending application filed on or about the same date herewith, Ser. No. 827,995.

The embodiment of the present invention in which an exclusive property or privilege is claimed are defined as follows:

1. In a decorative composition containing a dry mixture of a flock agent and an adhesive, the improvement wherein from 0.1 to 25 percent by weight of the total flock agent is composed of particles of expanded cellular polystyrene containing an ultraviolet responsive, luminescent material, said particles having an average size in the range of 25 microns to one-half inch.

2. In a composition as defined in claim 1 wherein said particles comprise from 0.1–25 percent by weight of the total flock agent, the remainder of the flock agent consisting of sulfite pulp.

3. In a composition as defined in claim 2 wherein said particles have an average particle size of one-sixteenth to one-fourth inch.

4. In a composition as defined in claim 1 wherein said adhesive is pregelatinized starch.

* * * * *